United States Patent Office 2,954,062
Patented Sept. 27, 1960

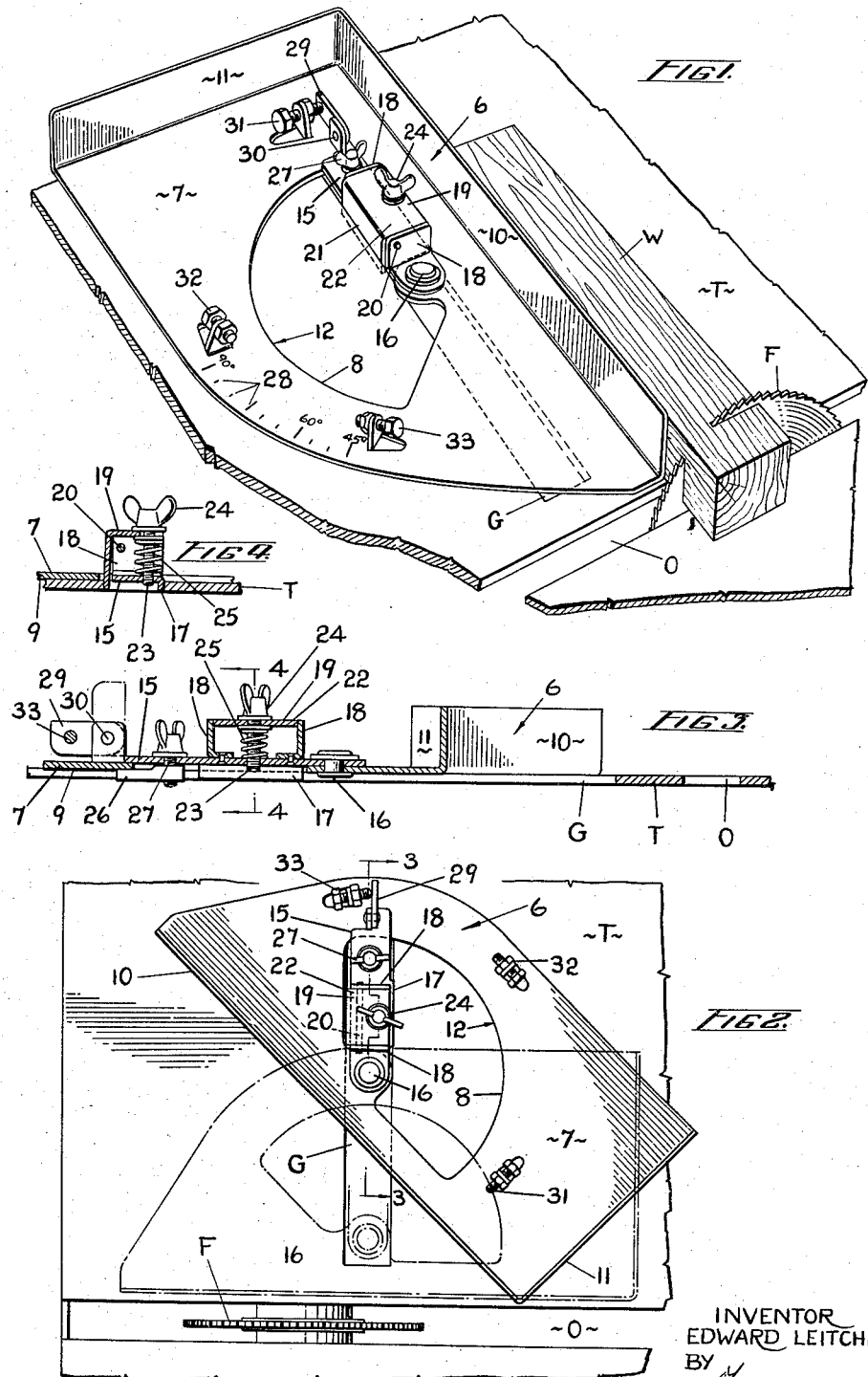

2,954,062
ADJUSTABLE GAUGES FOR A SAW TABLE
Edward Leitchner, 53 Collier St., Barrie, Ontario, Canada
Filed Apr. 9, 1959, Ser. No. 805,236
3 Claims. (Cl. 143—169)

My invention relates in general to adjustable gauges for power saw tables or benches of the kind in which there is employed a powered disc saw protruding upwardly from a slot provided in the top of the table or bench and operative to perform cutting operations. Disc saws of this type are widely employed in construction work by carpenters and others for facilitating rip sawing, cross-cut sawing, mitre and/or angular sawing. The saw table or bench may be of the type in which the work is fed to the saw but the invention is particularly concerned with an adjustable gauge for use in association with a portable electrically-driven hand saw which is movable along a slot in the table top or bench for cutting engagement with work held against the gauge.

A paramount object of my invention is to provide an improved gauge of the class referred to characterized in that it is adapted for facilitating such operations as rip sawing, cross-cut sawing, mitre and/or angular sawing. The distinctive feature of the adjustable gauge is that it can be readily applied and removed from the top of a saw table or bench and when attached thereto may be quickly and accurately set for making a desired cut.

The invention provides an adjustable gauge which is easy to use and inexpensive to manufacture.

A selected embodiment of the invention is illustrated in the accompanying drawing in which:

Fig. 1 is a perspective view of the gauge positioned on a power saw table and showing its use for making a cross-cut on a work-piece;

Fig. 2 is a top plan view of the gauge positioned on the saw table for making mitre cuts and showing in chain-dot lines a further position of the gauge for use in rip sawing;

Fig. 3 is a sectional view taken on the line 3—3 of Fig. 2; and

Fig. 4 is a sectional detail taken on the line 4—4 of Fig. 3.

To enable the invention to be more clearly understood with regard to its use there is illustrated at T a top of a power saw table of the kind in which the disc saw indicated at F is power operated and mounted on a carriage beneath the table top for movement along a slot denoted at O. It is customary in this class of portable power saw table to cause the rotating disc saw to approach the work by means of a treadle mechanism which enables one hand to be used for holding the work-piece against the gauge and the other hand free for other purposes incidental to the cutting operation. While the gauge of the present invention is primarily designed for use with a saw table of this class it is not to be considered to be restricted in this respect. The table top T is shown as supplied with the usual groove G at right angles to the saw slot O for enabling the gauge to be moved therealong and secured in any desired location as required for the purpose of positioning a work-piece in making a cut. It will be noted that in Fig. 1 a work-piece is indicated at W and is shown as being cut by the disc saw in a cross-cut operation while disposed against a face of the gauge.

The gauge is generally denoted at 6 and comprises a broad flat gauge plate 7 supplied with a substantial opening, indicated at 8, and having a bottom face 9 which rests upon the surface of the table top. The gauge plate has adjacent marginal edge portions supplied with upstanding flanges 10 and 11 at right angles to each other and presenting gauge faces against which work is placed and held while the saw blade is moved into cutting engagement therewith, as depicted in Fig. 1.

The opening 8 is formed with a curved marginal edge part 12 whose curvature is struck on a radius with a centre located adjacent to the gauge face 10.

The locating arm generally indicated at 15 is pivoted at an end of the gauge plate 7 coincident with the center on which the radius 12 of the opening 8 is struck and this locating arm extends to the curved marginal edge part 12 with its distal extremity overlying the same. The locating arm is pivoted by a headed pin or other approved means as indicated at 16 and is free to swing within the confines of the opening 8.

Mechanical means are supplied for clamping said locating arm on the table top T and to this end the clamping means has clamping effect in the guide groove G whereby the gauge may be positioned at any location along the length of the guide groove and held immobile in an adjusted position. The clamping means is shown as comprising a fixed tongue 17 depending from a side of said locating arm 15 and extending into said guide groove in abutment with a side thereof. The tongue is shown as integral with the locating arm. Lugs 18, two in number, upstand from said locating arm and are secured thereto in approved manner in spaced relation which lugs serve to pivotly support an L-shaped clamp plate 19. The pivotal connection of the clamp plate includes a pintle 20 which has its ends rotatably lodged in holes provided in the lugs 18. The intermediate portion of said pintle is made fast to the clamp plate 19 as by welding it to the depending part 21, but it will be understood that the pintle could be connected in any other conventional way. Said clamp plate is pivoted at its vertex and includes a depending part 21 and a complementary part 22 which overlies said locating arm in a more or less horizontal attitude.

The depending part 21 of the clamp plate extends into the guide groove G for engaging the side of the guide groove opposite to that engaged by the fixed tongue 17. Means are employed for pressing said clamp plate 19 into binding engagement with the adjacent side of said guide groove whereby the fixed tongue is pressed into firm abutment with the opposite side of the groove in order that the locating arm may be secured at any selected position along the length of the guide groove. A screw device is employed as means for pressing the clamp plate into binding engagement with the adjacent side of said guide groove. The screw device comprises a thumb screw 23 having its shank extending loosely through an opening provided in the top part 22 of said clamp part and threadedly engaged in the locating arm. The head 24 of the thumb screw is in abutment with the top face of the overlying part 22 of the clamp plate so that tightening pressure may be applied on the clamp plate by turning the thumb screw in one direction. The thumb screw is slacked off by turning it in the opposite direction and this removes the binding pressure and allows the arm to slide along the slot together with the gauge plate.

A helical compression spring 25 serves to press the top complementary part 22 of the clamp plate upwardly when the thumb screw is slackened off. According to this arrangement it will be quite clear that it is only necessary to move the locating arm together with the clamp plate along the guide groove G to the desired location and then tighten the thumb screw in order to secure the locating arm to the table top so that the gauge plate may be swung to any desired angular location for properly positioning a work-piece to be cut by the disc saw.

To secure the gauge relative to the table top it is clamped against swinging movement by a clamping device mounted on the distal end of the locating arm. This clamp device comprises a clamp finger 26 attached to the distal end of the locating arm by means of a thumb screw 27 and having an end projecting under and engaging the edge portion 12 of the aperture 18 in the gauge plate. It will be obvious that by tightening the thumb screw 27 the finger will be brought into clamping engagement with the edge portion 12 and will thus firmly hold the gauge plate against rotational movement about the pivotal axis 16 of the locating arm.

It follows from this arrangement that the locating arm is capable of being clamped at any location along the length of the guide slot G and that the gauge plate can be turned to any position relative to the table top and fixed in that position so that either or both of the gauge surfaces may be used. For instance in Fig. 1 the gauge plate has its long gauge face positioned at a normal angle to the saw blade for cross-cutting. In Fig. 2 the gauge plate has both its gauge faces disposed at 45 degrees to the saw blade so that either or both may be used for mitre cutting. Again in Fig. 2 the gauge plate is shown in a second position in phantom lines in which the longitudinal gauge surface one side thereof is disposed parallel to the saw blade for rip sawing. The gauge plate may be set at other angles and to this end there may be provided suitable graduations indicated in degrees of a circle as an aid in setting the gauge plate. The graduations are indicated at 28 in Fig. 1.

A stop bar 29 is used in conjunction with the graduations and pivotly extends from the distal end of the locating arm and is carried thereby. The pivotal connection of the stop bar is indicated at 30 and is arranged for swinging upwardly away from the gauge plate. The stop bar is raised manually. Stop devices 31, 32 and 33 cooperate with said stop bar and each is in the form of an upstanding ear rigid with the gauge plate and has a threadedly engaged screw fitted with a check-nut. These stop devices are conventional and it will be understood that by raising the stop bar 29 to clear the stop device 31 and loosening the thumb screw 27 will enable the gauge plate to be swung for locating it in a different position such that the stop bar may be lowered and positioned between the stop devices 32 and 33 whereby the graduations may be used in conjunction with the stop bar as a protractor arrangement as well understood in the art.

From the preceding description it will be manifest that my invention provides an adjustable gauge plate of a practical and serviceable character. It will be understood that such changes and modifications may be resorted to as fair they come within the scope of the appended claims.

What I claim is:

1. An adjustable gauge for a saw table having a guide groove, said gauge comprising a gauge plate having therein a substantial opening and having a bottom face for resting upon said table, said gauge plate having upstanding marginal gauge faces at right angles to each other, said opening bounded by a curved marginal edge part whose curvature is struck on a radius with a center located adjacent to one of said gauge faces, a locating arm pivoted at an end to said gauge plate coincident with said center and extending radially to said curved marginal edge part and capable of turning movement within the confines of said opening, manually operable clamp means for releasably securing said locating arm at its distal end to said curved marginal part of said gauge plate, a tongue fixedly depending from a side of said locating arm for extending into said guide groove and engaging a side thereof, an L-shaped clamp plate having leg parts at right angles and pivoted at its vertex to said locating arm in superposed disposition, said clamp plate having one of its leg parts depending into said guide groove for engaging the other side of said guide groove and having the complementary leg part overlying said locating arm, and a headed screw extending through a hole in said complementary part of said clamp plate and threadedly engaged with said locating arm, said screw having its head portion shouldered against said complementary leg part for applying pressure thereon in order to force said depending leg part into binding engagement with the adjacent side of said guide groove.

2. An adjustable gauge for a saw table having a guide groove, said gauge comprising a broad flat gauge plate having therein a substantial opening and having a bottom face for resting upon said table, said gauge plate having adjacent marginal edge portions supplied with upstanding gauge faces at right angles to each other, said opening bounded by a curved marginal edge part whose curvature is struck on a radius with a center located adjacent to one of said gauge faces, a locating arm pivoted at an end to said gauge plate coincident with said center and extending radially to said curved marginal edge part and capable of turning movement within the confines of said opening, manually operable clamp means for releasably securing said locating arm at its distal end to said curved marginal part of said gauge plate, mechanical means for guidably constraining said locating arm to sliding movement along said guide groove and for clamping said locating arm on said table in an adjusted position along said guide groove, said mechanical means comprising a fixed tongue depending from a side of said locating arm for extending into said guide groove and engaging a side thereof, lugs upstanding from said locating arm in spaced longitudinal disposition, an L-shaped clamp plate pivoted at its vertex to said lugs with a depending part extending into said guide groove for engaging the other side of said guide groove, the complementary part of said clamp being disposed to overlie said locating arm, and a headed screw extending through a hole in said complementary part of said clamp plate and threadedly engaged with said locating arm, said screw having its head portion shouldered against said complementary part of said clamp plate for pressing said depending part into binding contact with the adjacent side of said guide groove when said screw is tightened.

3. The adjustable gauge of claim 2, in which a helical compression encircles the screw and a spring acts to press said depending part of the clamp plate away from the adjacent side of said guide groove when the said screw is slacked off.

References Cited in the file of this patent

UNITED STATES PATENTS

| | | |
|---|---|---|
| 255,302 | Luther | Mar. 21, 1882 |
| 1,894,010 | Tautz | Jan. 10, 1933 |
| 2,601,878 | Anderson | July 1, 1952 |
| 2,857,943 | McEwan et al. | Oct. 28, 1958 |